(12) United States Patent
Prouzet

(10) Patent No.: US 10,473,174 B2
(45) Date of Patent: Nov. 12, 2019

(54) MECHANICAL BRAKE

(71) Applicant: Ratier-Figeac SAS, Figeac (FR)

(72) Inventor: Bertrand Prouzet, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 15/837,296

(22) Filed: Dec. 11, 2017

(65) Prior Publication Data

US 2018/0172097 A1 Jun. 21, 2018

(30) Foreign Application Priority Data

Dec. 16, 2016 (EP) ..................................... 16306707

(51) Int. Cl.
| | | |
|---|---|---|
| *F16D 55/224* | (2006.01) | |
| *F16D 65/56* | (2006.01) | |
| *B61H 5/00* | (2006.01) | |
| *F16D 55/31* | (2006.01) | |
| *F16D 65/52* | (2006.01) | |

(Continued)

(52) U.S. Cl.
CPC ............. *F16D 65/567* (2013.01); *B61H 5/00* (2013.01); *F16D 55/2245* (2013.01); *F16D 55/2255* (2013.01); *F16D 55/31* (2013.01); *F16D 65/0971* (2013.01); *F16D 65/18* (2013.01); *F16D 65/52* (2013.01); *F16D 2066/003* (2013.01); *F16D 2121/14* (2013.01); *F16D 2125/34* (2013.01); *F16D 2125/582* (2013.01); *F16D 2125/64* (2013.01); *F16D 2125/68* (2013.01)

(58) Field of Classification Search
CPC .... F16D 65/567; F16D 65/0971; F16D 65/52; F16D 65/18; F16D 55/2245; F16D 55/2255; F16D 55/31; F16D 2066/003; F16D 2121/14; F16D 2125/34; F16D 2125/582; F16D 2125/64; F16D 2125/68
See application file for complete search history.

(56) References Cited

U.S. PATENT DOCUMENTS 2,890,767 A 6/1959 Tack
4,345,674 A * 8/1982 Vacval .................... F16D 65/18
188/196 P (Continued)

FOREIGN PATENT DOCUMENTS

FR 2982923 A1 5/2013
JP 2016044751 A 4/2016

OTHER PUBLICATIONS

European Search Report for Application No. 16306707.7-1762, dated Jul. 7, 2017, 7 pages.

*Primary Examiner* — Thomas W Irvin
(74) *Attorney, Agent, or Firm* — Cantor Colburn LLP

(57) ABSTRACT

There is provided an apparatus for applying a braking force to a brake disc using a brake pad. The apparatus comprises a lever configured to rotate about a first fulcrum, and a pressing member attached to said lever and for urging a brake pad against a brake disc. A component is arranged and configured to ensure that said pressing member has a circular translational movement upon rotation of said lever, and a rotatable input member is configured to rotate a first member. In use, rotation of said first member causes movement of an actuating member along an first axis (A), and said axial movement of said actuating member causes said lever to rotate about said first fulcrum for applying a braking force to said brake disc.

14 Claims, 6 Drawing Sheets

(51) Int. Cl.
*F16D 55/2255* (2006.01)
*F16D 65/097* (2006.01)
*F16D 65/18* (2006.01)
F16D 66/00 (2006.01)
F16D 125/34 (2012.01)
F16D 125/58 (2012.01)
F16D 125/64 (2012.01)
F16D 121/14 (2012.01)
F16D 125/68 (2012.01)

(56) References Cited

U.S. PATENT DOCUMENTS

| | | | |
|---|---|---|---|
| 6,412,608 B1* | 7/2002 | Mohr | F16D 65/14 188/156 |
| 6,766,886 B2* | 7/2004 | Bendtsen | F16D 65/18 188/196 P |
| 6,845,853 B2* | 1/2005 | Baumann | F16D 65/18 188/167 |
| 8,100,232 B2* | 1/2012 | Forster | B60T 13/741 188/72.7 |
| 9,157,496 B2* | 10/2015 | Prouzet | F16D 55/2245 |
| 9,512,892 B2* | 12/2016 | Burgoon | F16D 65/54 |
| 9,889,865 B2* | 2/2018 | Asano | B60T 17/083 |
| 9,896,112 B2* | 2/2018 | Suzuki | B61H 5/00 |
| 2004/0026184 A1 | 2/2004 | Baumann et al. | |
| 2005/0029858 A1 | 2/2005 | Forster et al. | |
| 2009/0107777 A1* | 4/2009 | Kim | F16D 65/18 188/72.7 |
| 2013/0098719 A1* | 4/2013 | Furutani | B60T 1/04 188/77 R |
| 2019/0092306 A1* | 3/2019 | Goncalves | B60T 13/665 |

* cited by examiner

MECHANICAL BRAKE

FOREIGN PRIORITY

This application claims priority to European Patent Application No. 16306707.7 filed Dec. 16, 2016, the entire contents of which is incorporated herein by reference.

FIELD

The present disclosure relates generally to a braking system, and more specifically to a braking system for a rotor, for example an aircraft rotor such as a helicopter rotor.

BACKGROUND

Braking systems in the art typically employ some kind of hydraulic or electro-mechanical system that moves a pad onto a rotating part, for example a brake disc. The brake pad is moved using some form of actuator. Hydraulic actuators are known to have poor reliability, and also require the use of gaskets to seal them, which can degrade reliability. Conventional electrical braking systems are typically complex and also have reliability issues as the control electronics can be problematic. Mechanical brakes have the advantage of being relatively simple, but typically require a significant reduction in applied force.

It is desired to provide an improved braking system, in particular improvements to a mechanical braking system for an aircraft rotor.

SUMMARY

According to an aspect of the present disclosure, there is provided an apparatus for applying a braking force to a brake disc using a brake pad, comprising: a lever configured to rotate about a first fulcrum; a pressing member attached to the lever and for urging a brake pad against a brake disc; a link member attached to the pressing member and configured to rotate about a second fulcrum in such a manner that the brake pad remains substantially parallel to the brake disc while the lever rotates about the first fulcrum; and a rotatable input member configured to rotate a first member, wherein, in use, rotation of the first member causes movement of an actuating member along an first axis, and the axial movement of the actuating member causes the lever to rotate about the first fulcrum for applying a braking force to the brake disc.

A portion of the link member between its attachment to the pressing member and the second fulcrum may be of the same length and remain parallel with a corresponding portion of the lever that is between its attachment to the pressing member and the first fulcrum.

The pressing member may follow a circular translational movement upon rotation of the lever about the first fulcrum. The brake pad may remain substantially parallel to the brake disc throughout the entire range of travel of the lever.

According to an aspect of the present disclosure, there is provided an apparatus for applying a braking force to a brake disc using a brake pad, comprising: a lever configured to rotate about a first fulcrum; a pressing member attached to the lever and for urging a brake pad against a brake disc; a resilient member attached to or associated with the lever and configured to urge the pressing member towards a brake disc; and a rotatable input member configured to rotate a first member, wherein, in use, rotation of the first member causes movement of an actuating member along an first axis, and the axial movement of the actuating member causes the lever to rotate about the first fulcrum for applying a braking force to the brake disc.

The resilient member may be configured to urge the pressing member towards a brake disc throughout the entire range of travel of the lever. The resilient member may be a spring.

The above aspects, namely the use of a link member attached to the pressing member and configured to rotate about a second fulcrum in such a manner that the brake pad remains substantially parallel to the brake disc while the lever rotates about the first fulcrum, and a resilient member attached to or associated with the lever and configured to urge the pressing member towards a brake disc, provide alternative solutions to the problem of how to provide an improved apparatus for applying a braking force to a brake disc.

In both solutions, an efficient mechanical movement (as opposed to e.g., a hydraulic or electronic system) that does not require a significant reduction in applied force is used to transfer the force from the rotational input member to the brake pad, whilst ensuring the movement of the pressing member that urges the brake pad against a brake disc using a rotating lever.

In any of the aspects and embodiments described herein, the first member may comprise a first plate in an opposed relationship with a second plate, and the second plate may be operatively connected to the actuating member such that axial movement of the second plate may cause a corresponding axial movement of the actuating member.

The first plate and the second plate may be configured such that, in use, rotation of the first plate causes axial movement of the second plate so as to cause corresponding axial movement of the actuating member.

The first plate may be rotatably movable about the first axis and fixed against movement along the first axis, and/or the second plate may be axially movable along the first axis but fixed against rotational movement about the first axis.

A cam ball may be received in a cavity between the first plate and the second plate, and one of the first plate and the second plate may comprise a ramped surface such that, in use, rotation of the first plate may cause the cam ball to ride up the ramped surface and exert an axial force on the second plate so as to cause corresponding axial movement of the actuating member.

The apparatus may further comprise a resilient member positioned between the second plate and a portion of a stationary housing, wherein the resilient member may be configured to urge the second plate away from the actuating member once the braking force applied by rotation of the rotatable input member is removed. This can move the brake pad away from the brake disc and maintain the brake pad in its released position.

The apparatus may comprise a control system.

The apparatus may further comprise a sensor configured to monitor the position of the second plate. The control system may be configured to receive position data corresponding to the axial position of said second plate from said sensor, and determine whether said brake pad is engaged or not using said position data.

The actuating member may protrude through a stationary housing and may comprise a screw portion that extends into the housing. The actuating member may be threaded onto a nut that is attached to and axially movable with the second plate. The actuating member may be releasable from its connection to the link member, such that the actuating member, upon being released from its connection to the link member, can be rotated and the amount by which the actuating member protrudes from the housing can be adjusted, e.g., to account for wear of the friction surface of the brake pad.

The apparatus may further comprise a return drive (which name is merely intended to provide a reference for the components forming the return drive). The return drive may comprise a first movable member configured to move a limited and predetermined distance along a second axis between a first stop and a second stop, and a second movable member interference fit into the first movable member and operatively connected to the lever such that rotation of the lever about the first fulcrum may cause the second movable member to move along the second axis.

The interference fit may be or comprise a press fit or other friction fit. For example, a resilient member (such as an O-ring or rubber ring) may be placed between the piston and the plate.

Upon rotation of the lever in a first rotational direction, the first movable member and the second movable member may move together until the first movable member reaches the first stop, at which point any further rotation of the lever in the first rotational direction will cause the second movable member to overcome the interference fit and slide through the first movable member.

Upon rotation of the lever in a second, opposite rotational direction, the first movable member and the second movable member may move together until the first movable member reaches the second stop.

The return drive may further comprise a resilient member configured to urge the first movable member towards the second stop, wherein the force required to overcome the interference fit between the first movable member and the second movable member may be greater than the force exerted by the resilient member on the first movable member, when the first movable member reaches the second stop.

The apparatus may further comprise a sensor configured to monitor the position of the first movable member. The control system may be configured to receive position data corresponding to the axial position of said first movable member from said sensor, and determine whether said brake pad is engaged or not using said position data.

According to an aspect of the present disclosure, there is provided a method of applying a braking force to a brake disc using a brake pad.

The method may comprise rotating a lever about a first fulcrum, wherein the lever is attached to a pressing member for urging the brake pad against the brake disc.

In one embodiment, the lever and the pressing member may be configured such that the pressing member follows a circular translational movement upon rotation of the lever.

Alternatively, or additionally a link member may be attached to said pressing member and may be configured to rotate about a second fulcrum in such a manner that said brake pad remains substantially parallel to said brake disc while said lever rotates about said first fulcrum.

In another embodiment, a resilient member may be attached to or associated with said lever and may be configured to urge the pressing member towards a brake disc upon rotation of said lever.

In either embodiment, the method further comprises: rotating a first plate using a rotatable input member, wherein rotation of said first plate causes axial movement of an actuating member, and axial movement of said actuating member causes said rotation of said lever for applying a braking force to said brake disc.

The method may further comprise rotating a first plate using a rotatable input member, wherein rotation of the first plate may cause axial movement of an actuating member, and axial movement of the actuating member may cause the rotation of the lever for applying a braking force to the brake disc.

Certain features of the above described technology are advantageous in their own right, and so in accordance with a further aspect of the present disclosure, there is provided an apparatus for actuating a braking system, the apparatus comprising a linear, mechanical actuator comprising an actuating member for axially extending and applying a force to a braking component.

The apparatus may further comprise a first movable member configured to move a limited and predetermined distance along an axis between a first stop and a second stop, and a second movable member interference fit into the first movable member. The second movable member may be operatively connected to the actuating member, such that movement of the actuating member causes the second movable member move along an axis.

Upon movement of the actuating member in a first axial direction, the first movable member and the second movable member may move together until the first movable member reaches the first stop, at which point any axial movement of the actuating member in the first axial direction will cause the second movable member to overcome the interference fit and slide through the first movable member.

Upon movement of the actuating member in a second, opposite axial direction, the first movable member and the second movable member may move together until the first movable member reaches the second stop.

The apparatus may further comprise a resilient member configured to urge the first movable member towards the second stop, wherein the force required to overcome the interference fit between the first movable member and the second movable member may be greater than the force exerted by the resilient member on the first movable member, when the first movable member reaches the second stop.

According to an aspect of the present disclosure, there is provided an apparatus for applying a braking force to a brake disc using a brake pad, comprising: a lever configured to rotate about a first fulcrum; a pressing member attached to the lever and for urging a brake pad against a brake disc; a component arranged and configured to ensure that the pressing member has a translational movement, e.g. a circular translational movement upon rotation of the lever; and a rotatable input member configured to rotate a first member, wherein, in use, rotation of the first member causes movement of an actuating member along an first axis, and the axial movement of the actuating member causes the lever to rotate about the first fulcrum for applying a braking force to the brake disc.

The above features provide an improved apparatus for applying a braking force, in that a mechanical movement (as opposed to e.g., a hydraulic or electronic system) is used to transfer the force from the rotational input member to the brake pad, whilst ensuring a translational movement of the pressing member that urges the brake pad against a brake disc using a rotating lever.

The pressing member may have a translational movement, e.g. a circular translational movement throughout the entire range of movement of the lever.

The component may comprise a link member configured to rotate about a second fulcrum, wherein the link member may be attached to the pressing member. A portion of the link member between its attachment to the pressing member and the second fulcrum may be of the same length and remain parallel (e.g., throughout the entire range of movement of the lever) with a corresponding portion of the lever that is between its attachment to the pressing member and the first fulcrum.

Alternatively, the component may comprise a resilient member attached to the lever and configured to urge the pressing member towards a brake disc. The resilient member may be configured to urge the pressing member towards a brake disc throughout the entire range of travel or movement of the lever, and in such a manner that the friction surface of the brake pad remains parallel with an opposing surface of the brake disc throughout the entire range of motion of the pressing member. The resilient member may be a spring.

As used herein, "translational movement" of a body is intended to mean that the body moves from one point of space to another such that every point of the body moves in the same direction and over the same distance, and without any rotation. As such, the "translational movement" of the pressing member is intended to mean that the pressing member does not rotate throughout its movement upon rotation of the lever, such that a friction surface of a brake pad urged by the pressing member may not rotate throughout the entire range of movement of the pressing member. This can ensure that a friction surface of the pressing member can remain parallel with an opposing surface of the brake disc throughout the range of motion of the pressing member.

The term "circular translational movement" is intended to mean that the translation of the pressing member follows a circular trajectory, due to its attachment to the rotating lever. This means that a circular, rotational movement (i.e., rotation of the lever) can be used to actuate the brake in combination with the translational movement of the pressing member.

DETAILED DESCRIPTION

Figure 1:
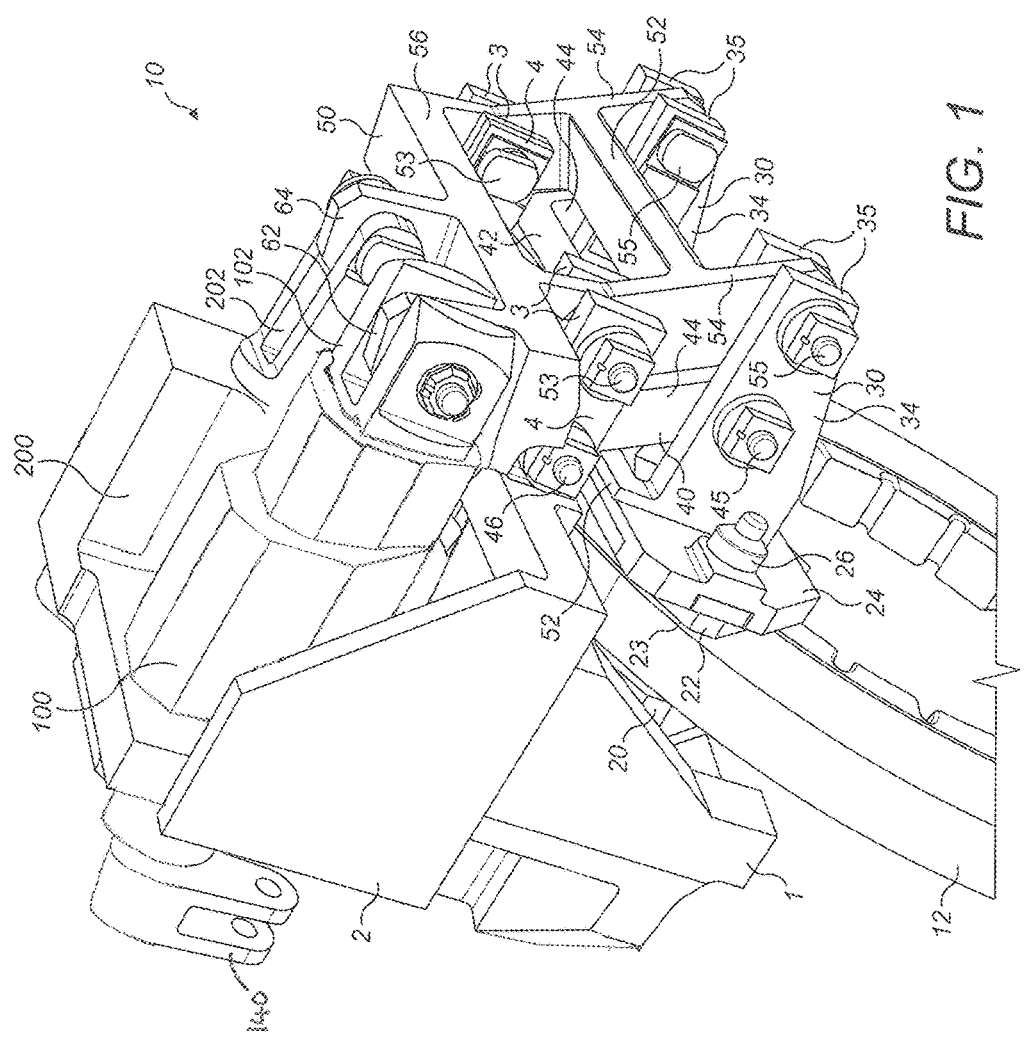
FIG. 1 shows a braking system according to an embodiment.

A braking system 10 is disclosed and may comprise a brake disc 12 operatively connected to a rotor (not shown), for example an aircraft (e.g., helicopter) rotor. The brake disc 12 may be positioned next to a housing 1 that is fixed in position, i.e., stationary relative to any moving and/or rotating parts of the braking system 10.

A first, fixed brake pad 20 may be positioned on one side of the brake disc 12 and may be attached to the housing 1. The fixed brake pad 20 is stationary relative to any moving and/or rotating parts of the braking system 10, and may be attached to the housing 1 via any suitable means.

The housing 1 comprises a portion 2 that holds in place various parts of the braking system 10, as described in more detail below. The housing portion 2 comprises two arm portions, each comprising two elongate flange members 3 having a cavity therebetween.

A second, movable brake pad 22 may be positioned on the opposite side of the brake disc 12 and in an opposing relationship to the fixed brake pad 20, such that a friction surface 23 of the movable brake pad 22 is configured to contact the brake disc 12. The movable brake pad 22 is configured, as described in more detail below, to move into contact with the brake disc 12 and force the disc 12 into the opposing fixed brake pad 20 in order to provide a braking force to the rotor operatively connected to the brake disc 12.

In accordance with the disclosure, an apparatus is provided to, in use, move the movable brake pad 22 such that the braking force can be applied. The movable brake pad 22 may be connected to a support member 24, e.g., using a bolt 26. The support member 24 may be connected to a pressing member 30 that is configured to move in such a way that the friction surface 23 of the movable brake pad 22 remains parallel to the opposed surface of the brake disc 12. To do this the pressing member 30 has a circular translational movement, for example through the use of two link members 40, 50. The pressing member 30 may be in the form of a U-shape and may comprise a base portion 32 and two opposed arm portions 34. The arm portions 34 may each comprise two elongate flange members 35 having a cavity therebetween.

A first link member 40 is connected to the pressing member 30 and may comprise two side portions 44 connected by a crossbeam 42, wherein a first end of each side portion 44 slots into a respective arm portion 34 of the pressing member 30. That is, a first end of each side portion 44 slots into the cavity between flange members 35 of its respective arm portion 34 and is connected thereto using, e.g., bolts 45. A second, opposed end of each side portion 44 slots into a respective arm portion 4 of the housing 2. That is, a second end of each side portion 44 slots into the cavity between flange members 3 of its respective arm portion 4 of the housing 2 and is attached thereto using, e.g., bolts 46. The first link member 40 is rotatable about its connection to the housing 2 (e.g., the bolts 46).

A second link member or lever 50 is connected to the pressing member 30 and may comprise two side portions 54 connected by a crossbeam 52, wherein a first end of each side portion 54 slots into a respective arm portion 32 of the pressing member 30. That is, a first end of each side portion 54 slots into the cavity between flange members 35 of its respective arm portion 34 and is connected thereto using, e.g., bolts 55.

The second link member 50 may be pivotally attached to the housing 2. Each side portion 54 of the second link member 50 slots into the cavity between flange members 3 and is attached thereto using, e.g., bolts 53. The side portions 54 of the second link member 50 extend from a base portion 56 that is positioned above the arm portions 4 of the housing 2. The second link member 50 is rotatable about its connection to the housing 2, i.e., bolts 53, which form a fulcrum.

Between their respective attachments to the arm portions 34 of the pressing member 30 and the arm portions 4 of the housing 2, the side portions 44 of the first link member 40 and the side portions 54 of the second link member 50 remain parallel and are of the same length, such that rotation of the second link member 50 causes a circular translational movement of the pressing member 30.

Rotation of the second link member 50 is effected using a linear actuator 100. The linear actuator 100 comprises an actuating member 102 that may connect to a flange 62 of the second link member 50, which extends from the base portion 56 of the second link member 50 on a side of opposite to that from which the side portions 54 extend from. Upon extension of the actuating member 102, the second link member 50 rotates about a pivoting axis (i.e., its attachment to the arm portions 4 of the housing 2) which, in combination with the first link member 40 causes the pressing member 30 to move with a circular translational movement. This means that the movable brake pad 22 remains substantially parallel to the opposed surface of the brake disc 12.

A return drive 200 may also be provided to ensure that the braking force is removed, as well as ensuring a constant braking force throughout the lifetime of the brake pad (i.e., as the brake pad wears). The return drive 200 comprises a protruding member 202 that may connect to a flange 64 of the second link member 50, which flange 64 extends from the base portion 56 of the second link member 50 on a side of opposite to that from which the side portions 54 extend from. The return drive 200 is described in more detail with reference to FIG. 3 below.

Figure 2:
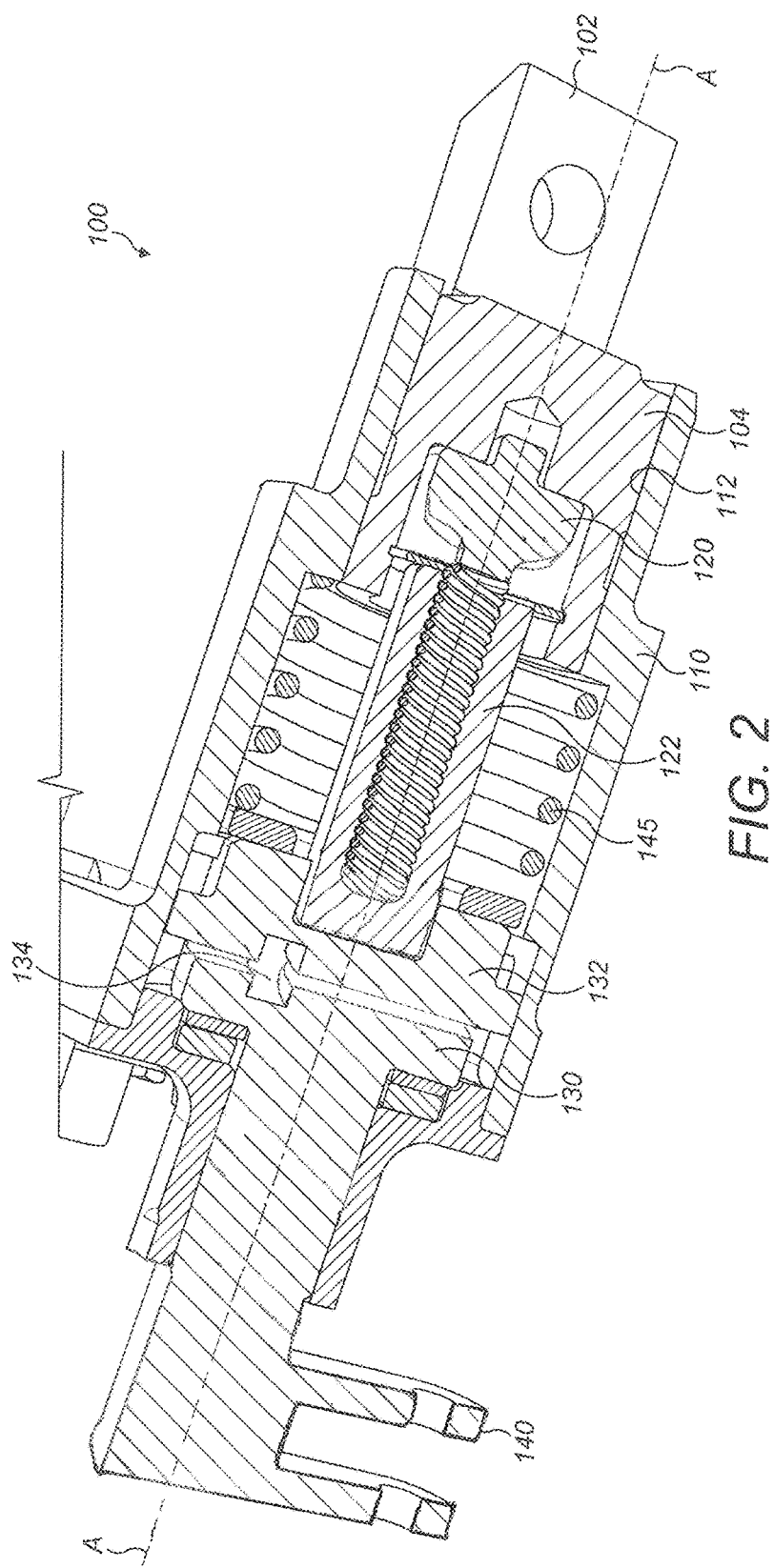
FIG. 2 shows a cross section through a linear actuator of the embodiment of FIG. 1.

Returning to the linear actuator 100, this is shown in cross section in FIG. 2. As seen in FIG. 1, the actuating member 102 may protrude through a housing 110 and may have a cup-shaped portion 104 that slides within a cylindrical cavity 112 within the housing 110.

A screw 120 may be installed in the cup-shaped portion 104 of the actuating member 102 and may be threaded onto a nut 122. The screw 102 may be installed in the cup-shaped portion 104 or otherwise configured to allow rotation of the screw 120 in one rotational direction within the cup-shaped portion 104, for example the screw 120 may be non-rotatable in a first rotational direction when the nut 122 pushes the screw 120 to extend the actuating member 102, but rotatable in a second, opposite direction when the nut 122 pulls the screw 120 in certain situations. Rotation of the screw 120 in the second, opposite rotational direction may cause the actuating member 102 to extend, which can help to account for wear of the friction surfaces of the brake disc 12 and/or brake pads 20, 22 as described in more detail below.

Movement of the nut 122 along the longitudinal axis A of the linear actuator 100 in an actuating direction may cause the screw 120 to move axially and, in turn, cause the actuating member 102 to move in order to rotate the second link member 50 (FIG. 1).

The nut 122 may be moved by way of a cam and ball arrangement. A first plate 130 may be in opposed relationship to a second plate 132, wherein the first plate 130 is rotatably movable (i.e., about the longitudinal axis A of the linear actuator 100) and fixed against axial movement (i.e., along the longitudinal axis A of the linear actuator 100), and the second plate 132 is axially movable but fixed against rotational movement. The nut 122 may be attached to and axially movable with the second plate 132.

A cam ball (not shown) may be received in a cavity 134 formed between the plates 130, 132. One or other (or both) of the first plate 130 and the second plate 132 may comprise a ramped surface such that rotation of the first plate 130 causes the cam ball to ride up the ramped surface, so as to exert an axial force on the second plate 132 and cause the second plate 132, and the nut 122 to move in an axial direction.

Rotation of the first plate 130 (and therefore actuation of the braking system) is caused by rotation of a rotatable input member in the form of a control lever 140. A return spring 145 may be positioned between the second plate 132 and a portion of the housing 110 and may be configured to urge the second plate 132 away from the actuating member 102 in order to remove the braking force once the force applied to the control lever 140 has been removed.

The screw 120 may be restricted against rotation in the first rotational direction, such that when the plate 132 moves axially to apply the brake the screw 120 and nut 122 move axially together. The retraction of the screw 120 and actuating member 102 are described in more detail below.

Other linear (mechanical) actuators are known in the art and may be used in place of the one shown in FIG. 2 in the broadest aspects of the present disclosure, which as discussed above involve the use of a rotatable input member, or control lever 140 that is configured to rotate a first member (first plate 130). In use, rotation of the first member causes movement of the actuating member along the axis A. Axial movement of the actuating member 102 causes the second link member or lever 50 to rotate about its fulcrum 53 and apply a braking force to said brake disc.

Figure 3:
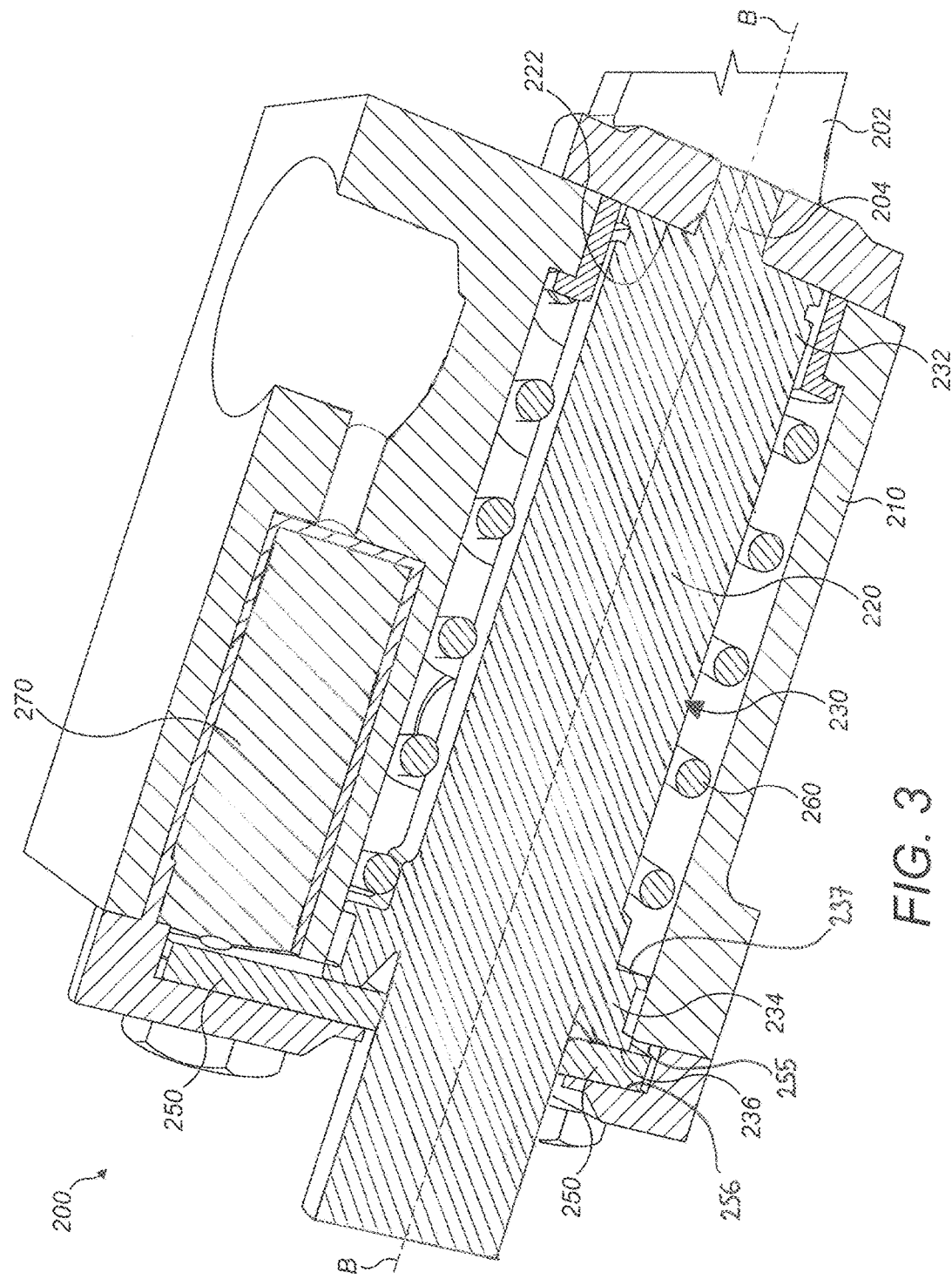
FIG. 3 shows a cross section through a return drive of the embodiment of FIG. 1.

FIG. 3 shows a cross section through the return drive 200 that may be connected to the second link member 50.

The protruding member 202 of the return drive 200 may surround a pin 204 that extends into a housing 210 of the return drive 200. The pin 204 may form part of a piston 220, wherein axial movement of the piston 220 (along the longitudinal axis B of the return drive 200, which may also be the longitudinal axis of the piston 220) causes, or is caused by, axial movement of the protruding member 202 via the pin 204. The pin 204 extends into the protruding member 202 and may be fixed thereto by any suitable method. Other arrangements to operatively connect the piston 220 and the second link member 50 may be used.

A portion 230 of the piston 220 within the housing 210 comprises a first end 232 corresponding to the bottom 222 of the portion 230.

A first movable member in the form of a plate 250 is configured to move a limited and/or predetermined distance along the longitudinal axis B of the return drive 200 between a first stop 255 and a second stop 256.

A second end 234 of the portion 230 has a circumferential protrusion comprising two opposing, radial surfaces 236, 237 (with respect to the longitudinal axis B of the return drive 200). A first 236 of the two opposing surfaces may abut the plate 250 which is axially movable within the housing 210 by the limited and/or predetermined distance. The amount of movement or travel of the plate 250 that is permitted may correspond to the amount of movement of the movable brake pad 22 (FIG. 1) during a braking procedure (if wear of the brake pad 22 is not taken into account).

A return spring 260 may be positioned between a second 237 of the opposing surfaces and a portion of the housing 210 and is configured to urge the plate 250 away from the first stop 255 in order to remove the braking force once the force applied to the control lever 140 has been removed.

In various embodiments the return spring 260 may be replaced by a different resilient member, such as a torsion spring around fulcrum 53.

The piston 220 is interference fit into the plate 250 so that, upon a great enough axial force, the piston 220 slides through the plate 250. This force should be greater than that exerted by the return spring 260 to avoid unwanted relative movement between the piston 220 and the plate 250. The interference fit may be or comprise a press fit or other friction fit. For example, a resilient member (such as an O-ring or rubber ring) may be placed between the piston 220 and the plate 250 to provide the necessary friction.

The return stroke of the movable brake pad 22 is limited by the amount of travel of the plate 250, which is able to remain constant due to the piston sliding through the plate 250 upon a great enough axial force as described above. In this manner, the return stroke (or "backlash") of the movable brake pad 22 may remain constant.

A position sensor 270 may be provided to determine the position of the plate 250 in the housing 210, so that a control system or operator of the braking system 10 can determine or know the status of the brake. A control system may be configured to receive position data corresponding to the axial position of the plate 250 from the position sensor 270, and determine whether the brake pad 22 is engaged or not using the position data. For example, if the plate 250 is determined to be abutting the first stop 255, then the control system may determine that the brake pad 22 is engaged with the brake disc 12, and/or if the plate 250 is determined to be abutting the second stop 256, then the control system may determine that the brake pad 22 is not engaged with the brake disc 12. The control system may output data (e.g., a status report) relating to whether the brake pad 22 is engaged or not.

As described above, the piston 220 is interference fit into the plate 250 and may be operatively connected to the second link member 50 via, e.g., its pin 204 such that rotation of the second link member 50 about its fulcrum (bolts 53) causes the piston 220 to move along the axis B of the return drive 200.

Upon application of a braking force, the second link member 50 will rotate in a first rotational direction (e.g., a braking direction to move the brake pad 22 into contact with the brake disc 12) and the plate 250 and the piston 220 will move together (due to the interference fit between them) until the plate 250 reaches the first stop 255, at which point any further rotation of the second link member 50 in the first rotational direction will cause the piston 220 to overcome the interference fit and slide through the plate 250. This will typically happen if the brake disc has worn by a significant amount. The braking force may be (and typically is) relatively large compared to the force required to overcome the interference fit.

Once the braking force is removed, the second link member 50 will rotate in a second rotational direction (e.g., opposite to the first rotational direction to move the brake pad 22 away from the brake disc 12), and the plate 250 and the piston 220 move together until the plate 250 reaches the second stop 256. This movement may be ensured by the return spring 260, which as described above may not have the strength to overcome the interference fit. As such, the plate 250 and the piston 220 stop moving once the plate reaches the second stop 256.

The limited and predetermined distance that the plate 250 moves along the axis B (between the first stop 255 and the second stop 256) may be equal or proportional to the distance that the brake pad 22 moves when urged by the pressing member 30 against the brake disc 12 (which distance may be referred to as the return stroke or backlash).

The combination of the linear actuator 100 and return drive 200, with the actuation mechanism described above can improve the wear of the brake pad over time, by providing a uniform contact of the movable brake pad 22 with the brake disc 12 as well as a constant return stroke of the movable brake pad 22. The constant return stroke is ensured by the limited range of travel of the plate 250, and the relative strength of the return spring 260 and the interference fit between the plate 250 and the piston 220.

Figure 4:
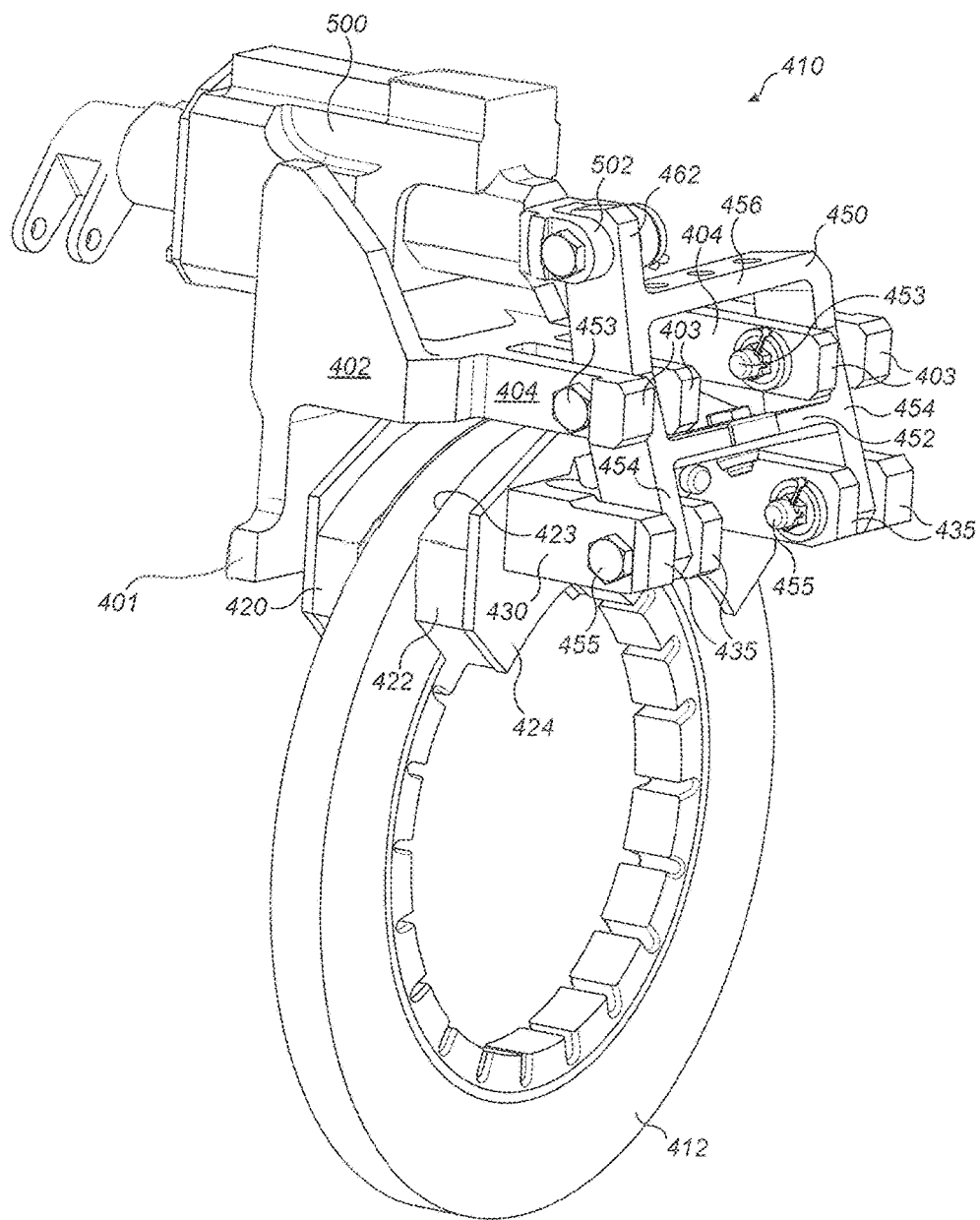
FIG. 4 shows a braking system according to another embodiment.
Figure 5:
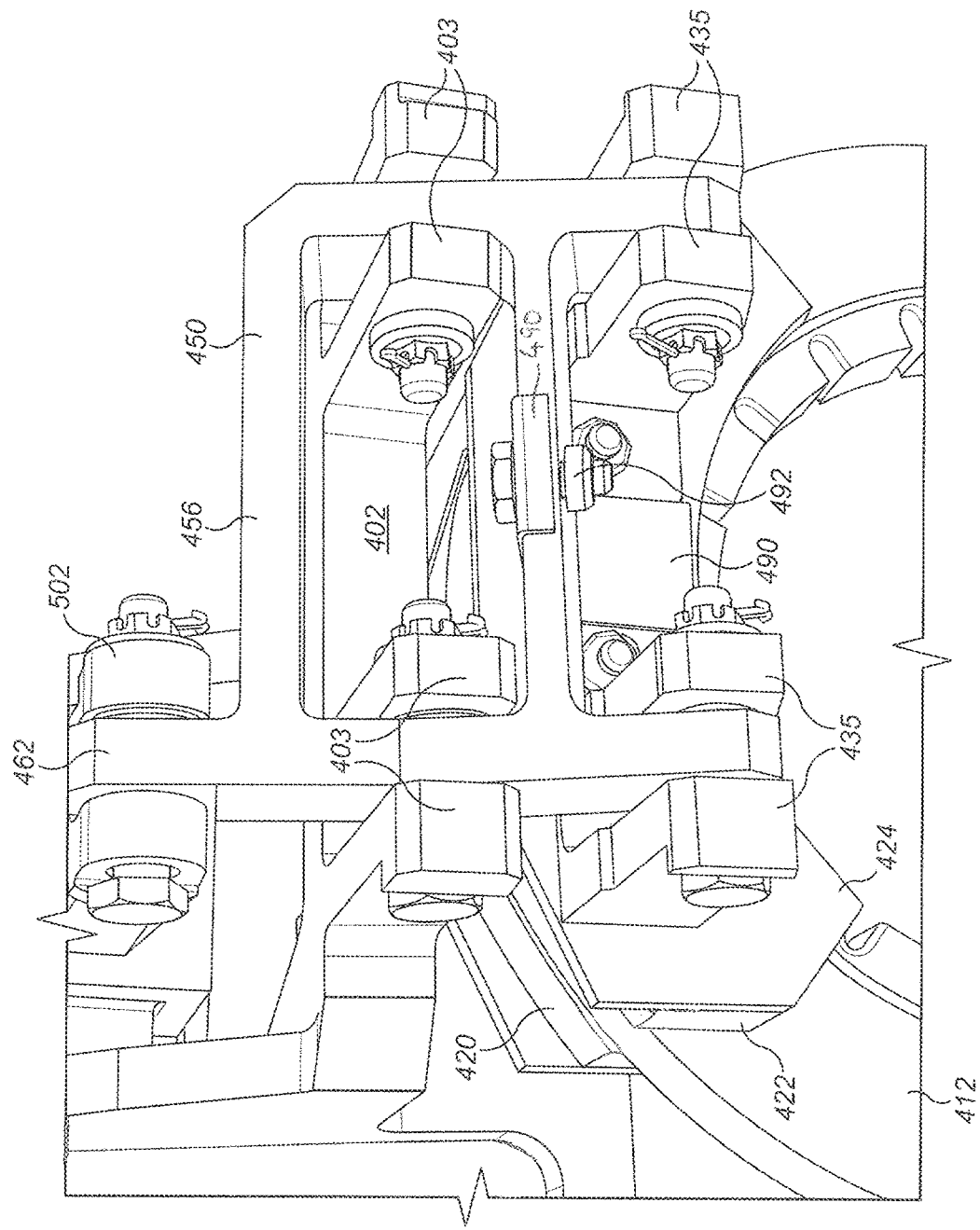
FIG. 5 shows a view of part of the braking system of the embodiment of FIG. 4.
Figure 6:
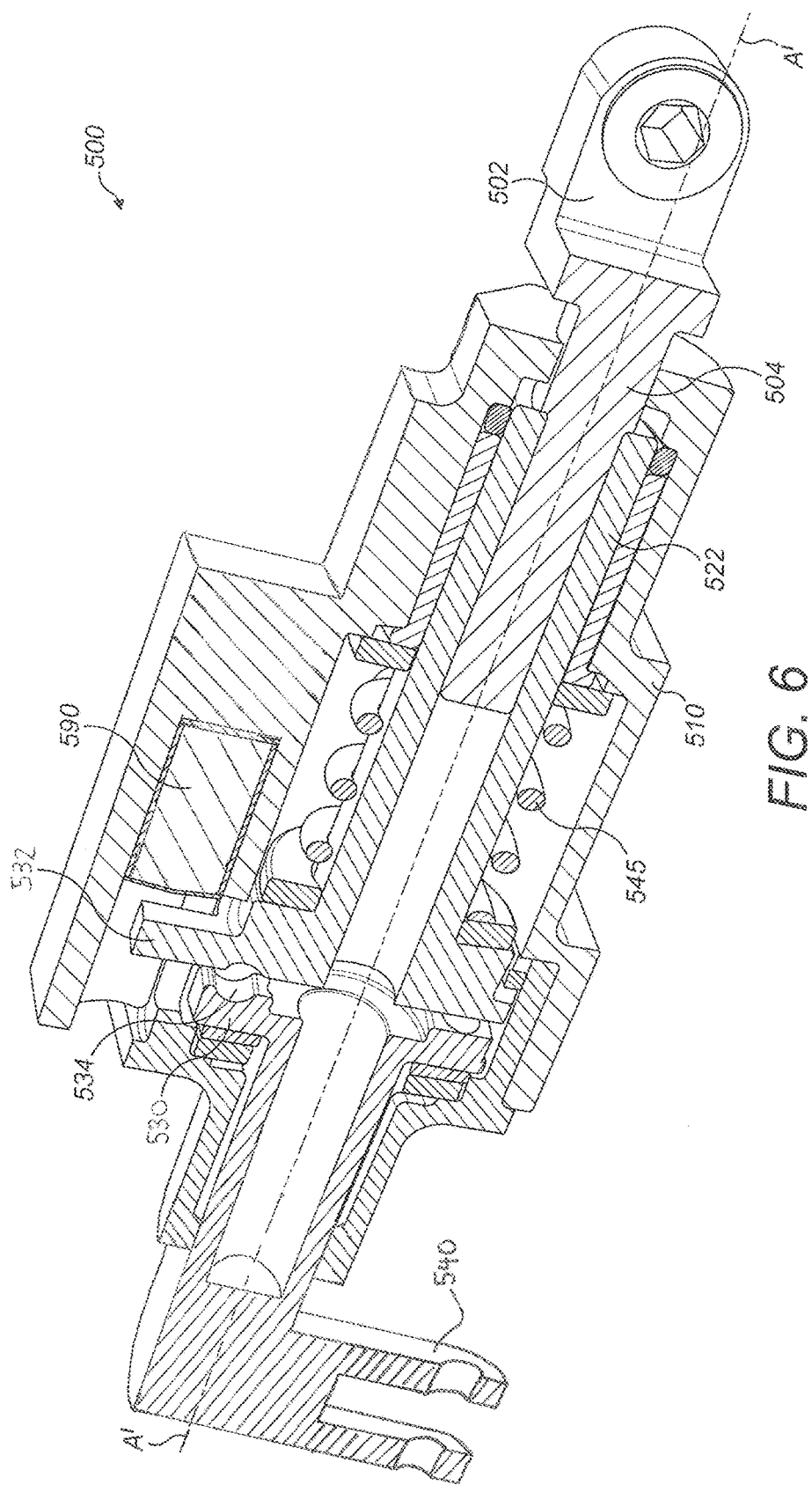
FIG. 6 shows a cross section of a linear actuator of the embodiment of FIG. 4.

FIGS. 4-6 shows another embodiment of the present disclosure, which is similar to the embodiment of FIGS. 1-3 in that it comprises a linear actuator 500 that is configured to move a pressing member 430 via a link member or lever 450 in order to perform the braking function. A fixed brake pad 420 and a movable brake pad 422 are located on opposed sides of a brake disc 412.

The link member 450 is similar to the second link member 50 of FIGS. 1-3, and like features have been denoted with reference numerals with four hundred added to them.

The link member 450 is connected to the pressing member 430 and may comprise two side portions 454 connected by a crossbeam 452, wherein a first end of each side portion 454 may slot into a respective arm portion 432 of the pressing member 430. That is, a first end of each side portion 454 may slot into the cavity between flange members 435 of its respective arm portion 434 and may be connected thereto using, e.g., bolts 455.

The link member 450 may be pivotally attached to the housing 402. Each side portion 454 of the link member 450 may slot into the cavity between flange members 403 and may be attached thereto using, e.g., bolts 453. The side portions 454 of the link member 450 may extend from a base portion 456 that is positioned above the arm portions 404 of the housing 402. The link member 450 may be rotatable about its connection to the housing 402, i.e., bolts 453, which forms a fulcrum.

In contrast to the embodiment of FIGS. 1-3, only a single link member is provided, namely the link member 450. A resilient member in the form of a spring 490 is provided and configured to urge the pressing member 430 towards the brake disc 412.

As shown in FIG. 5, the spring 490 may be attached to the link member 450 using e.g., a bolt 492, and may be an L-shape so as to press against the surface of the pressing member 430 facing away from the brake disc 412, and urge the pressing member 430 towards the brake disc 412.

Rotation of the link member 450 may be effected using a linear actuator 500. The linear actuator 500 may comprise an actuating member 502 that connects to a flange 462 of the link member 450, which extends from the base portion 456 of the link member 450 on a side of opposite to that from which the side portions 454 extend from. Upon extension of the actuating member 502, the link member 450 rotates about a pivoting axis (e.g., its attachment to the arm portions 404 of the housing 402) to urge the pressing member 430 towards the brake disc 412.

In this arrangement the movable brake pad 422 may not remain parallel to the opposed surface of the brake disc 412 throughout the rotation of the link member 450. Instead, the pressing member 430 may be held by the spring 490 such that the friction surface of the brake pad 422 is pressed flat against the brake disc 412 when the brake pad 422 is brought into contact with the brake disc 412 upon rotation of the link member 450. The spring 490 and the pressing member 430 may be configured so that the friction surface of the brake pad 422 is roughly parallel to the brake disc 412 initially, e.g., prior to rotation of the link member 450 to engage the brake.

In various embodiments, the retaining spring 490 may instead be replaced by another suitable resilient member, such as a torsion spring, which may, for example, be placed around fulcrum 455. It will be appreciated that in various embodiments the arrangement of link member 450, pressing member 430 and retaining spring 490 may be used with the actuator 100 and return drive 200 described above in respect of FIGS. 1-3, that is to replace the first link member 50, pressing member 30 and second link member 40.

FIG. 6 shows a cross section of the linear actuator 500.

The actuating member 502 may protrude through a housing 510 and may have a screw portion 504 that extends into the housing 510 and is threaded onto a nut 522. Movement of the nut 522 along the longitudinal axis A' of the linear actuator 500 may cause the screw 520 to move axially and, in turn, cause the actuating member 502 to move in order to rotate the second link member 450 (FIG. 1).

The nut 522 may be moved by way of a cam and ball arrangement, similar to that shown and described in respect of the linear actuator 100 of FIGS. 1-3. A first plate 530 is in opposed relationship to a second plate 532, wherein the first plate 530 is rotatably movable (i.e., about the longitudinal axis A' of the linear actuator 500) and fixed against axial movement (i.e., along the longitudinal axis A' of the linear actuator 500), and the second plate 532 is axially movable but fixed against rotational movement. The nut 522 is attached to and axially movable with the second plate 532.

A cam ball (not shown) may be received in a cavity 534 formed between the plates 530, 532. One or other (or both) of the first plate 530 and the second plate 532 may comprise a ramped surface such that rotation of the first plate 530 causes the cam ball to run up the ramped surface, so as to exert an axial force on the second plate 532 and cause the second plate 532, and the nut 522 to move in an axial direction.

Rotation of the first plate 530 (and therefore actuation of the braking system) may be caused by rotation of a control lever 540. A return spring 545 may be positioned between the second plate 532 and a portion of the housing 510 and may be configured to urge the second plate 532 away from the actuating member 502 in order to remove the braking force once the force applied to the control lever 540 has been removed, so as to, in use, move the brake pad 422 away from the brake disc 412 and maintain the brake pad 422 in its released position.

A position sensor 590 may be provided to determine the position of the plate 530 in the housing 510, so that a control system or operator of the braking system can determine or know the status of the brake. A control system may be configured to receive position data corresponding to the axial position of the second plate 532 from the position sensor 590, and determine whether the brake pad 422 is engaged or not using the position data. For example, if the second plate 532 is determined to be at a first axial limit (e.g., when the actuating member 502 is fully extended), then the control system may determine that the brake pad 422 is engaged with the brake disc 412, and/or if the second plate 532 is determined to be at a second, opposite axial limit (e.g., when the actuating member 502 is fully retracted), then the control system may determine that the brake pad 422 is not engaged with the brake disc 412. The control system may output data (e.g., a status report) relating to whether the brake pad 422 is engaged or not.

In order to account for wear using the embodiment of FIGS. 4-6, the actuating member 502 may be released from its connection to the link member 450. The actuating member 502 may be connected to the nut 522 via a screw arrangement, as described above, such that, upon being released from its connection to the link member 450 the actuating member 502 can be rotated and the amount by which the actuating member 502 protrudes from the housing 510 can be increased. This means that the distance that the actuating member 502 moves in its axial direction (and therefore the stroke of the brake pad 422) can be monitored (e.g., using position sensor 590) and adjusted to account for wear of the friction surface of the brake pad 422.

In order to account for wear using the any of the embodiments described in respect of FIGS. 1-3, when the actuating member 102 retracts, the resilient member 260 may move the brake pad 22 away from the brake disc 12 until the plate 250 reaches the second stop 256. This arrangement allows to have constant brake pad 22 release stroke proportional to the backlash whatever the wear may be on the friction surface of the brake pads 22 (and/or the brake disc 12). The actuating member 102, is connected to the protruding member 202 via the second link member 50. Further rotation of the control lever 140 may be needed for it to return to its initial position, and this may be facilitated by generating an additional axial movement of the second plate 132 using the resilient member 145. The resilient member 145 may transmit a pulling load to the screw 120 by pushing on the second plate 132, which is itself operatively connected to the nut 122 so that axial movement of the second plate 132 causes a corresponding axial movement of the nut 122. The screw 120 is pulled by the nut 122, which causes the screw 120 and nut 122 to unscrew. This, in turn, causes the screw 120 to push the actuating member 102 such that it extends, which accounts for wear of the friction surface of the brake pads 20, 22 and/or brake disc 12. The amount by which the actuating member 102 extends may be proportional to the amount of wear on the brake pads 20, 22 and/or the brake disc 12 This can ensure that the angular stroke of the input member (e.g., control lever 140,) may remain constant despite the amount of wear of the brake pads 20, 22 and/or brake disc 12.

Although the present disclosure has been described with reference to preferred embodiments, it will be understood by those skilled in the art that various changes in form and detail may be made without departing from the scope of the disclosure as set forth in the accompanying claims. For example, the nut 122 and screw 120 arrangement shown and described in respect of FIG. 2 may be modified, such that (for example) the screw thread is provided on a portion or extension of the second plate 132, and a portion or extension of the cup-shaped portion 104 may comprise the cooperating nut.

The invention claimed is:

1. An apparatus for applying a braking force to a brake disc using a brake pad, comprising:
  a lever configured to rotate about a first fulcrum;
  a pressing member attached to said lever and for urging a brake pad against a brake disc;
  a link member attached to said pressing member and configured to rotate about a second fulcrum in such a manner that said brake pad remains substantially parallel to said brake disc while said lever rotates about said first fulcrum;
  a rotatable input member configured to rotate a first member, wherein, in use, rotation of said first member causes movement of an actuating member along an first axis (A), and said axial movement of said actuating member causes said lever to rotate about said first fulcrum for applying a braking force to said brake disc; and
  a return drive comprising:
    a first movable member configured to move a limited and predetermined distance along a second axis (B) between a first stop and a second stop; and
    a second movable member interference fit into said first movable member and operatively connected to said lever such that rotation of said lever about said first fulcrum causes said second movable member to move along said second axis (B); wherein:
    upon rotation of said lever in a first rotational direction, said first movable member and said second movable member move together until said first movable member reaches said first stop, at which point any further rotation of said lever in said first rotational direction will cause said second movable member to overcome said interference fit and slide through said first movable member; and upon rotation of said lever in a second, opposite rotational direction, said first movable member and said second movable member move together until said first movable member reaches said second stop.

2. An apparatus as claimed in claim 1, wherein a portion of said link member between its attachment to said pressing member and said second fulcrum is of the same length and remains parallel with a corresponding portion of said lever that is between its attachment to said pressing member and said first fulcrum.

3. An apparatus as claimed in claim 1, wherein said pressing member follows a circular translational movement upon rotation of said lever about said first fulcrum.

4. An apparatus as claimed in claim 1, wherein:
said first member comprises a first plate in an opposed relationship with a second plate, and said second plate is operatively connected to said actuating member such that axial movement of said second plate causes a corresponding axial movement of said actuating member; and
said first plate and said second plate are configured such that, in use, rotation of said first plate causes axial movement of said second plate so as to cause corresponding axial movement of the actuating member;
said first plate is rotatably movable about said first axis (A,A') and fixed against movement along said first axis (A,A'); and
said second plate is axially movable along said first axis (A,A') but fixed against rotational movement about said first axis (A,A').

5. An apparatus as claimed in claim 4, wherein a cam ball is received in a cavity between said first plate and said second plate, and one of said first plate and said second plate comprises a ramped surface such that, in use, rotation of said first plate causes said cam ball to ride up the ramped surface and exert an axial force on said second plate so as to cause corresponding axial movement of the actuating member.

6. An apparatus as claimed in claim 4, further comprising a resilient member positioned between the second plate and a portion of a stationary housing, wherein the resilient member is configured to urge the second plate away from the actuating member once the braking force applied by rotation of the rotatable input member is removed, so as to, in use, move the brake pad away from the brake disc and maintain the brake pad in its released position.

7. An apparatus as claimed in claim 4, further comprising a sensor configured to monitor the axial position of said second plate and a control system configured to receive position data corresponding to the axial position of said second plate from said sensor, and determine whether said brake pad is engaged or not using said position data.

8. An apparatus as claimed in claim 1, wherein the actuating member protrudes through a stationary housing and comprises a screw portion that extends into the housing and is threaded onto a nut that is attached to and axially movable with the second plate, wherein the actuating member is releasable from its connection to said link member, such that the actuating member, upon being released from its connection to the link member, can be rotated and the amount by which the actuating member protrudes from the housing can be adjusted to account for wear of the friction surface of the brake pad.

9. An apparatus as claimed in claim 1, wherein said return drive further comprises a resilient member configured to urge said first movable member towards said second stop, wherein the force required to overcome the interference fit between said first movable member and said second movable member is greater than the force exerted by said resilient member on said first movable member when said first movable member reaches said second stop.

10. An apparatus as claimed in claim 1, further comprising a sensor configured to monitor the axial position of said first movable member, and a control system configured to receive position data corresponding to the axial position of said first movable member from said sensor, and determine whether said brake pad is engaged or not using said position data.

11. An apparatus for applying a braking force to a brake disc using a brake pad, comprising:
a lever configured to rotate about a first fulcrum;
a pressing member attached to said lever and for urging a brake pad against a brake disc;
a resilient member attached to or associated with said lever and configured to urge the pressing member towards a brake disc;
a rotatable input member configured to rotate a first member, wherein, in use, rotation of said first member causes movement of an actuating member along an first axis (A'), and said axial movement of said actuating member causes said lever to rotate about said first fulcrum for applying a braking force to said brake disc; and
a return drive comprising:
a first movable member configured to move a limited and predetermined distance along a second axis (B) between a first stop and a second stop; and
a second movable member interference fit into said first movable member and operatively connected to said lever such that rotation of said lever about said first fulcrum causes said second movable member to move along said second axis (B); wherein:
upon rotation of said lever in a first rotational direction, said first movable member and said second movable member move together until said first movable member reaches said first stop, at which point any further rotation of said lever in said first rotational direction will cause said second movable member to overcome said interference fit and slide through said first movable member; and
upon rotation of said lever in a second, opposite rotational direction, said first movable member and said second movable member move together until said first movable member reaches said second stop.

12. An apparatus as claimed in claim 11, wherein said resilient member is configured to urge the pressing member towards a brake disc throughout the entire range of travel of the lever.

13. An apparatus as claimed in claim 11, wherein said resilient member is a spring.

14. A method of applying a braking force to a brake disc using a brake pad, the method comprising rotating a lever about a first fulcrum, wherein said lever is attached to a pressing member for urging said brake pad against said brake disc, wherein either:
a link member is attached to said pressing member and is configured to rotate about a second fulcrum in such a manner that said brake pad remains substantially parallel to said brake disc while said lever rotates about said first fulcrum; or a resilient member is attached to or associated with said lever and is configured to urge the pressing member towards a brake disc upon rotation of said lever; and the method further comprises:

rotating a first plate using a rotatable input member, wherein rotation of said first plate causes axial movement of an actuating member, and axial movement of said actuating member causes said rotation of said lever for applying a braking force to said brake disc; and controlling a return stroke of the brake pad using a return drive, the return drive comprising:

a first movable member configured to move a limited and predetermined distance along a second axis (B) between a first stop and a second stop; and a second movable member interference fit into said first movable member and operatively connected to said lever such that rotation of said lever about said first fulcrum causes said second movable member to move along said second axis (B); wherein:

upon rotation of said lever in a first rotational direction, said first movable member and said second movable member move together until said first movable member reaches said first stop, at which point any further rotation of said lever in said first rotational direction will cause said second movable member to overcome said interference fit and slide through said first movable member; and upon rotation of said lever in a second, opposite rotational direction, said first movable member and said second movable member move together until said first movable member reaches said second stop.

* * * * *